(12) United States Patent
Touboul et al.

(10) Patent No.: US 9,048,981 B2
(45) Date of Patent: Jun. 2, 2015

(54) WIRELESS TELECOMMUNICATONS NETWORK

(75) Inventors: Assaf Touboul, Natanya (IL); Oz Barak, Hod Hasharon (IL)

(73) Assignee: QUALCOMM Incorporated, San Diego, CA (US)

( * ) Notice: Subject to any disclaimer, the term of this patent is extended or adjusted under 35 U.S.C. 154(b) by 57 days.

(21) Appl. No.: 12/273,572

(22) Filed: Nov. 19, 2008

(65) Prior Publication Data

US 2010/0027694 A1 Feb. 4, 2010

Related U.S. Application Data

(60) Provisional application No. 61/085,016, filed on Jul. 31, 2008.

(51) Int. Cl.
*H04L 5/00* (2006.01)
*H04J 11/00* (2006.01)

(52) U.S. Cl.
CPC ............ *H04L 5/0032* (2013.01); *H04J 11/0093* (2013.01); *H04L 5/0007* (2013.01); *H04L 5/0037* (2013.01)

(58) Field of Classification Search
USPC .................. 370/310, 315, 328, 329, 350, 503
See application file for complete search history.

(56) References Cited

U.S. PATENT DOCUMENTS

| | | | |
|---|---|---|---|
| 2004/0204097 A1* | 10/2004 | Scheinert et al. | 455/561 |
| 2005/0148368 A1* | 7/2005 | Scheinert et al. | 455/561 |
| 2006/0067205 A1* | 3/2006 | Jung et al. | 370/203 |
| 2006/0148411 A1* | 7/2006 | Cho et al. | 455/67.13 |
| 2007/0105585 A1 | 5/2007 | Lee et al. | |
| 2007/0155315 A1* | 7/2007 | Lee et al. | 455/11.1 |
| 2007/0280098 A1* | 12/2007 | Bhatt et al. | 370/208 |
| 2008/0159217 A1* | 7/2008 | Chang et al. | 370/329 |
| 2008/0268858 A1* | 10/2008 | Wu et al. | 455/448 |
| 2009/0052395 A1* | 2/2009 | Bao et al. | 370/331 |
| 2009/0052418 A1* | 2/2009 | Semper | 370/338 |

(Continued)

FOREIGN PATENT DOCUMENTS

| | | | | |
|---|---|---|---|---|
| EP | 1146760 A2 | * | 10/2001 | H04Q 7/36 |
| EP | 1940189 A2 | | 7/2008 | |

(Continued)

OTHER PUBLICATIONS

Kassner, Michael "iMAT: MIMO without Multiple Antennas." Feb. 25, 2008.*

(Continued)

*Primary Examiner* — Wei Zhao
*Assistant Examiner* — Robert M Morlan
(74) *Attorney, Agent, or Firm* — Holland & Hart LLP

(57) ABSTRACT

A femtocell including a transceiver and a processor coupled to the transceiver for implementing transmission and reception in a wireless communication network utilizing OFDM/OFDMA, and the processor including modules for collecting information about neighboring base stations and femtocells and utilizing the collected information to select the femtocell's own radio parameters, and a method for radio resource allocation in a wireless communication network implementing OFDM/OFDMA, the method including performing preamble synchronization by a sniffing femtocell on a neighboring femtocell, and determining radio resource parameters of the neighboring femtocell based on the synchronized preamble.

20 Claims, 5 Drawing Sheets

(56) References Cited

U.S. PATENT DOCUMENTS

| | | | |
|---|---|---|---|
| 2009/0061924 A1* | 3/2009 | Morrill et al. | 455/552.1 |
| 2009/0086691 A1* | 4/2009 | Balasubramanian | 370/338 |
| 2009/0129354 A1* | 5/2009 | Gupta et al. | 370/338 |
| 2009/0131098 A1* | 5/2009 | Khandekar et al. | 455/525 |
| 2010/0054196 A1* | 3/2010 | Hui | 370/329 |

FOREIGN PATENT DOCUMENTS

| | | | |
|---|---|---|---|
| WO | WO 2007079685 A1 * | 7/2007 | H04Q 7/20 |
| WO | WO-2008047140 A1 | 4/2008 | |

OTHER PUBLICATIONS

Newton, Harry "Newton's Telecom Dictionary", 23$^{rd}$ Edition, 2007.*

International Search Report and Written Opinion, Int'l App. No. PCT/IL2009/000749, ISA/EPO, Dec. 30, 2009, 6 pgs.

Han et al., "Support for Femtocell," IEEE C802.16m-08/642, Jul. 7, 2008, 8 pgs., Venue: IEEE 802.16m-08/024: Call for Comments and Contributions on Project 802.16m System Description Document (SDD), on the topic of "Upper MAC Concepts", XP 17616582A.

IPCOMM et al., "Femto-cell Interference Management and Handoff Parameters," C30-20071203-035, Dec. 7, 2007, 12 pgs., XP 62167677A, 3rd Generation Partnership Project 2, 3GPP2 TSG-C.

Zhou et al., "Interference Mitigation by Initial Configuration for Femtocell Access Points in IEEE802.16m Network," IEEE C802.16m-08/605r1, Jul. 7, 2008, 6 pgs., XP 17733712A, Venue: IEEE 802.16 Session #56, Denver, CO, USA.

EPO, Supplementary European Search Report, European App. No. 09802613.1, Dec. 4, 2014, 9 pgs., European Patent Office/The Hague.

* cited by examiner

WIRELESS TELECOMMUNICATONS NETWORK

CROSS REFERENCES

The present Application for Patent claims priority to U.S. Provisional Patent Application No. 61/085,016 by Touboul et al., entitled "Wireless Telecommunications Network Utilizing Femtocells," filed Jul. 31, 2008, assigned to the assignee hereof, and expressly incorporated by reference herein.

FIELD OF THE INVENTION

The present invention relates to wireless telecommunications networks, in general and, in particular, to femtocells for use in a wireless telecommunications network, particularly WiMAX and LTE.

BACKGROUND OF THE INVENTION

Broadband wireless is expected to be one of the main drivers of the telecommunications industry. There is a substantial increase in demand for broadband connectivity, with personal broadband being the key growth engine for mobile wireless broadband networks.

In conventional wireless telecommunications networks, network planning, deployment and interference management of base stations are programmed in advance at the time of installation by an operator. The traditional approach for mobile WiMAX network infrastructure deployment is similar to that of cellular phone networks. The network is based on macro-cell deployment, that is, the base stations, radios and antennas are installed on top of high towers, transmitting at high power, so as to maximize the base station coverage area. However, as smaller and smaller cells are utilized, the increasing numbers of base stations, particularly femtocells, in a geographical area create a major problem of interference management.

There is known from applicants' co-pending US patent application publication no. US 2008/0090575, entitled WiMAX Access Point Network with Backhaul Technology, a mobile WiMAX system, as defined in IEEE Standard 802.16e-2005 Standardization for WiMAX. According to this application, there is provided in-band, point-to-point backhaul between the various network access elements in a WiMAX network deployed in micro- or pico-cells. This WiMAX network provides increased traffic capacity of the base station, while not greatly increasing the interference caused with neighboring cells, preferably by using several directional antennae on each base station, and utilizing MIMO or Beam forming (spatial filtering) techniques to reduce interference. This patent application also describes in detail the self planning capabilities of base stations organized in a virtual cluster with a central feeder, where there is communication via point to point backhaul between the base stations in each cluster.

However, as the number of femtocells deployed in indoor locations increases, network planning (i.e., allocation of radio resources, frequency, power, and sector ID to each femtocell) becomes another major problem. Since femtocells (base stations) now sit in the end user premises, it is unreasonable to request the user to configure the femtocell by himself. Accordingly, a simple way to synchronize his femtocell to neighboring femtocells, both indoors and outdoors, is required.

Furthermore, in the past, only the mobile stations were required to synchronize on their associated base stations, due to the physical separation between base stations. Nowadays, the various base stations must also synchronize on each other, in order for a mobile wireless network to operate properly. The quality of synchronization in the network directly impacts the interference generated by the network. The transmission of voice, video and data through any communication network requires a stable frequency reference, and precise frequency synchronization is especially critical in mobile networks for the successful call signal hand-off between base stations, as well as for the transport of real-time services.

Accordingly, with the movement of base stations indoors, and as more networks transition to an IP-centric backhaul, there is a need for a method and device for providing synchronization between neighboring base stations and interference management in micro-, pico- and femtocell base stations.

SUMMARY OF THE INVENTION

The present invention relates to a neighboring base station "sniffer" integrated in a micro-, pico- or femtocell in a wireless network, such as WiMAX or LTE or other 4G network. For purposes of this application, the term "femtocell" will be used to denote any type of base station or relay station for use in wireless communication networks, such as WiMAX and LTE.

There is provided, according to one embodiment of the invention, a femtocell having a transceiver and a processor coupled to said transceiver, the femtocell including means for synchronization of the femtocell on a preamble transmitted by a neighboring femtocell; and means for determination of channel and radio parameters of the neighboring femtocell based on the preamble.

According to a preferred embodiment, the femtocell further includes means for allocating channel and radio parameters to the femtocell based on the determined parameter.

There is also provided, according to the present invention, a femtocell including a transceiver and a baseband processor coupled to the transceiver for implementing transmission and reception in a wireless communication network utilizing OFDM/OFDMA (Orthogonal Frequency-Division Multiplexing/Orthogonal Frequency-Division Multiple Access), and the processor and coupled modules including means for collecting information about neighboring femtocells and computing a selected channel and radio parameters from the collected information, wherein the means for collecting includes a module for preamble detection and synchronization with a neighboring base station in the network, coupled to the baseband processor, an RSSI (Radio Signal Strength Indicator) and CINR (Carrier to Interference-plus-Noise Ratio) detection module in the baseband processor, wherein the processor is adapted to implement channel and radio parameter selection based on information received from these modules.

There is further provided, according to the invention, a method for radio resource allocation of a femtocell in a wireless communication network implementing OFDM/OFDMA, the method including performing preamble synchronization by a sniffing femtocell on a neighboring femtocell, and determining radio resource parameters of the neighboring femtocell based on the synchronized preamble.

According to a preferred embodiment, the method further includes calculating and selecting radio resource parameters of the sniffing femtocell based on the determined parameters.

Preferably, the femtocells utilize a wireless point to point communication method for management purposes, but not for backhaul traffic. In this way, they are able to take advantage of other benefits of the wireless backhaul capabilities—self planning, synchronization, wireless or over-the-air management of distributed backhaul, etc.

BRIEF DESCRIPTION OF THE DRAWINGS

The present invention will be further understood and appreciated from the following detailed description taken in conjunction with the drawings in which.

DETAILED DESCRIPTION OF THE INVENTION

The present invention relates to self-planning and self-organization between any type of base stations that are not connected in a cluster and managed by a feeder, in any size cell, e.g., femto-, pico-, micro- or macro-. As stated above, for purposes of this application, the term "femtocell" will be used to denote any of these types of base station or relay station for use in wireless communication networks, particularly WiMAX and LTE. This is accomplished by integrating synchronization and neighboring cell radio resource "sniffing" capabilities in the femtocells. As used in the present invention, the term "sniffing" refers to the capability of each femtocell to monitor wireless signals transmitted by neighboring femtocells and determine from those signals, parameters of the transmissions of those neighboring femtocells, particularly for use in radio resource allocation.

The invention is particularly useful for femtocells which serve as indoor base stations providing access services inside a building or small area, and do not require wireless backhaul, as they have wired backhaul, such as a DSL line or Ethernet. In this case, wireless point to point backhaul communication can be utilized between the femtocells for self-planning and self-installation purposes. It will be appreciated that a self-installed femtocell eliminates the need for deployment network planning, i.e., frequency planning, antenna direction alignment, antenna width tuning, and power allocation to each sector, each of which is required in conventional systems.

Figure 1A:
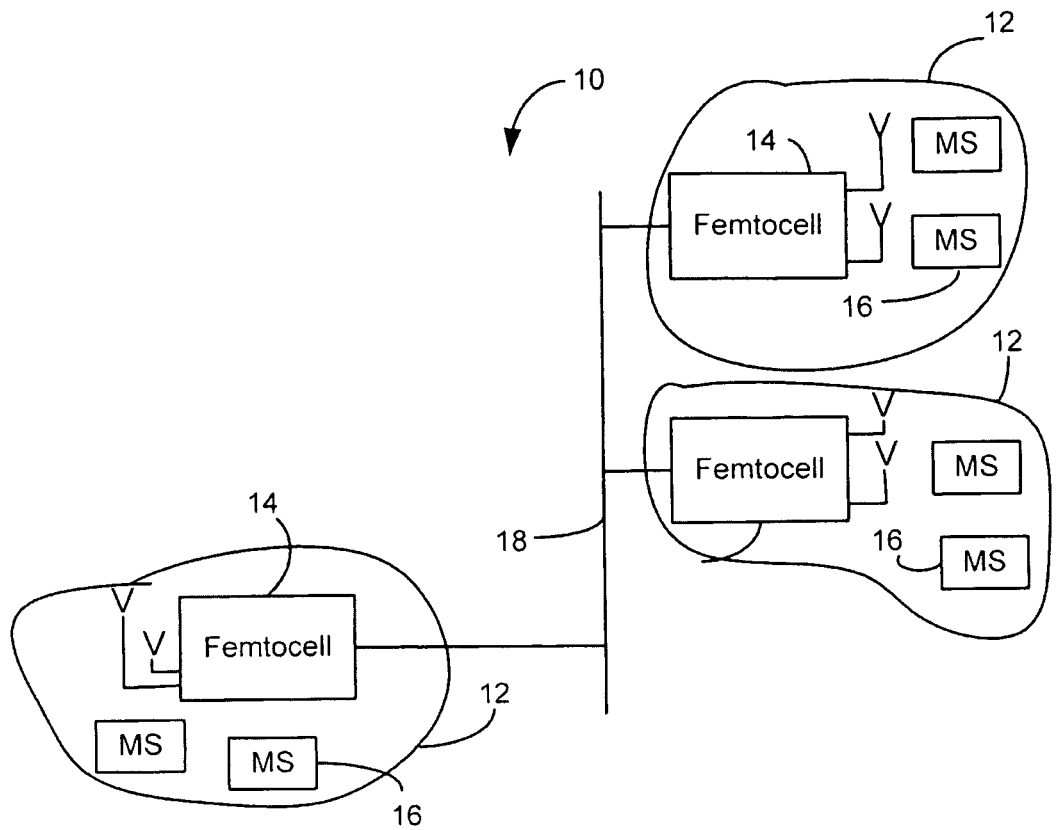
FIG. 1a is a schematic illustration of a distributed femtocells network, constructed and operative in accordance with one embodiment of the present invention.

Referring now to FIG. 1a, there is shown a schematic illustration of a distributed femtocell network 10, constructed and operative in accordance with one embodiment of the present invention. Network 10 includes a plurality of Radio Access Networks (RAN) 12. Each RAN 12 includes a femtocell 14 (or pico-cell base station, or similar) and one or more mobile stations (subscribers) 16. Each femtocell 14 is coupled to a core network (not shown) via wired backhaul 18, e.g., XDSL or Ethernet. When a new femtocell 14 is deployed in the network, it needs a RAN frequency, a RAN power profile and a RAN segment ID.

Figure 1B:
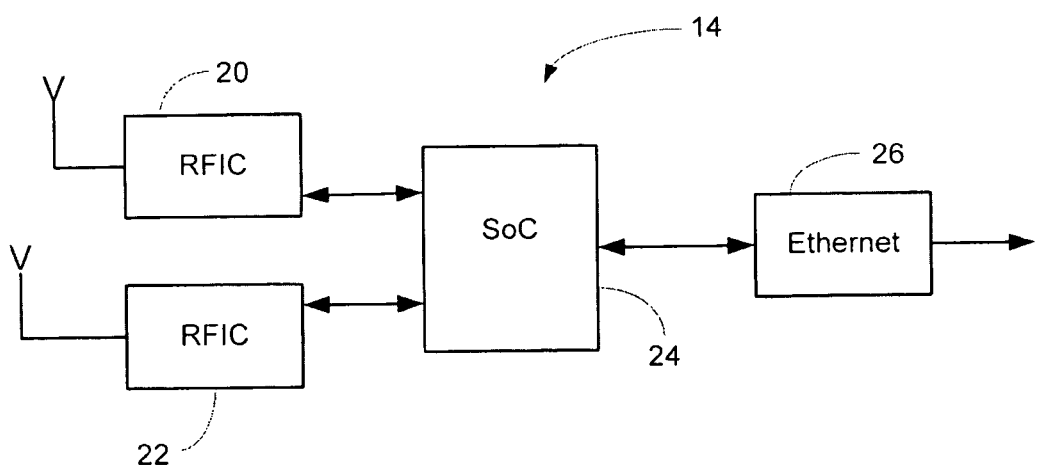
FIG. 1b is a block diagram illustration of a femtocell, according to one embodiment of the invention.

One example of a femtocell 14 is illustrated schematically in FIG. 1b. As can be seen, femtocell 14 includes two RF IC antennas, one for transmission 20 and one for reception 22. The femtocell baseband, modem, MAC, network processor and software of the present invention are preferably implemented as a hardware platform using a SoC (System on Chip) 24, that should be capable of running all base station functionalities, both hardware and software. In addition, it should incorporate, in one example, integrated hardware and software modules for preamble detection and synchronization, RSSI (Received Signal Strength Indication) and CINR detectors, Frame Control Header (FCH) and MAPS decoding, all as implemented in customer premises (CPE) and Mobile Station (MS) devices. These hardware modules, together with appropriate software, form a femtocell having the integrated OFDM/OFDMA base station sniffer incorporated therein. Typically, femtocell 14 is wired to the Ethernet 26 or to an XDSL line.

This structure enables the femtocell to implement a complete cell sniffing procedure, so as to locate neighboring femtocells and collect relevant information concerning them. Thus, the femtocell can scan potential (or predefined) RF carriers and acquire the basic parameters of its neighbor base stations, such as Cell ID, occupied segments, frame alignment, symbol timing offset and carrier frequency offset. The femtocell also decodes the DCD (Data Carrier Detect) information transmitted by the neighboring base stations. Thus, using this data, together with the RSSI and CINR estimations it carries, the femtocell maps the cellular environment surrounding it. This information is applied by the processor of the femtocell to implement an interference mitigation mechanism. For example, decisions to switch from a certain frequency channel to another channel (in the femtocell defined group of channels), and/or adjustment of power control can be made based on the interference measurement.

It is a particular feature of the invention that the femtocell 14 is capable of sniffing its neighboring femtocells, in order to select its own channel and radio resource parameters. The first step is synchronization as a mobile station on neighboring femtocells. In particular, femtocell 14 performs preamble synchronization. Each femtocell 14 transmits its own preamble on its own frequency. The preamble includes basic information about the femtocell—namely, a base station identifier (BSID), and sector ID.

Figure 2:
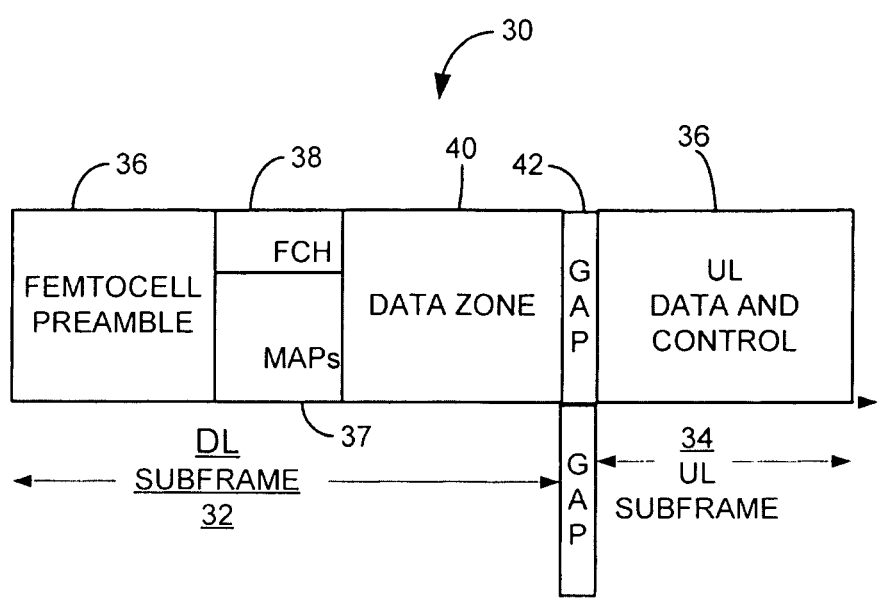
FIG. 2 is an exemplary WiMAX frame structure, according to one embodiment of the present invention.

There is shown, in FIG. 2, an exemplary WiMAX frame structure. The frame 30 includes a downlink sub-frame 32 and an uplink sub-frame 34. In the downlink sub-frame 32, is the WiMAX preamble 36, followed by the MAPs 37, Frame Control Header 38 and the data zone 40, with the content to be transmitted. Gaps 42 are provided in the frame to permit the transceiver to switch between downlink and uplink. The uplink sub-frame 34 includes the uplink data and control 36. The synchronization method of the present invention utilizes the downlink preamble, which starts the downlink sub-frame. It will be appreciated that this preamble corresponds to specific BSID and segment number information. Synchronization on the preamble identifies the particular base station and ensures that detection measurements can be accurate and associated with that base station.

It will be appreciated by those skilled in the art that an LTE frame, or other 4G technology frame, has a substantially similar structure, although the various elements may have different names. For example, the LTE reference symbol corresponds to the WiMAX preamble, the LTE PDCCH corresponds to the WiMAX MAP, and so on.

Thus, each sniffing femtocell will periodically measure RSSI and CINR of each neighboring femtocell preamble it receives and update a neighboring femtocell database per its channel. An algorithm of the present invention in the femtocell determines its own radio resources allocation, e.g., frequency, power and sector, depending on the measurements it conducted (for example, the frequency of the weakest transmission received by the femtocell).

Figure 5:
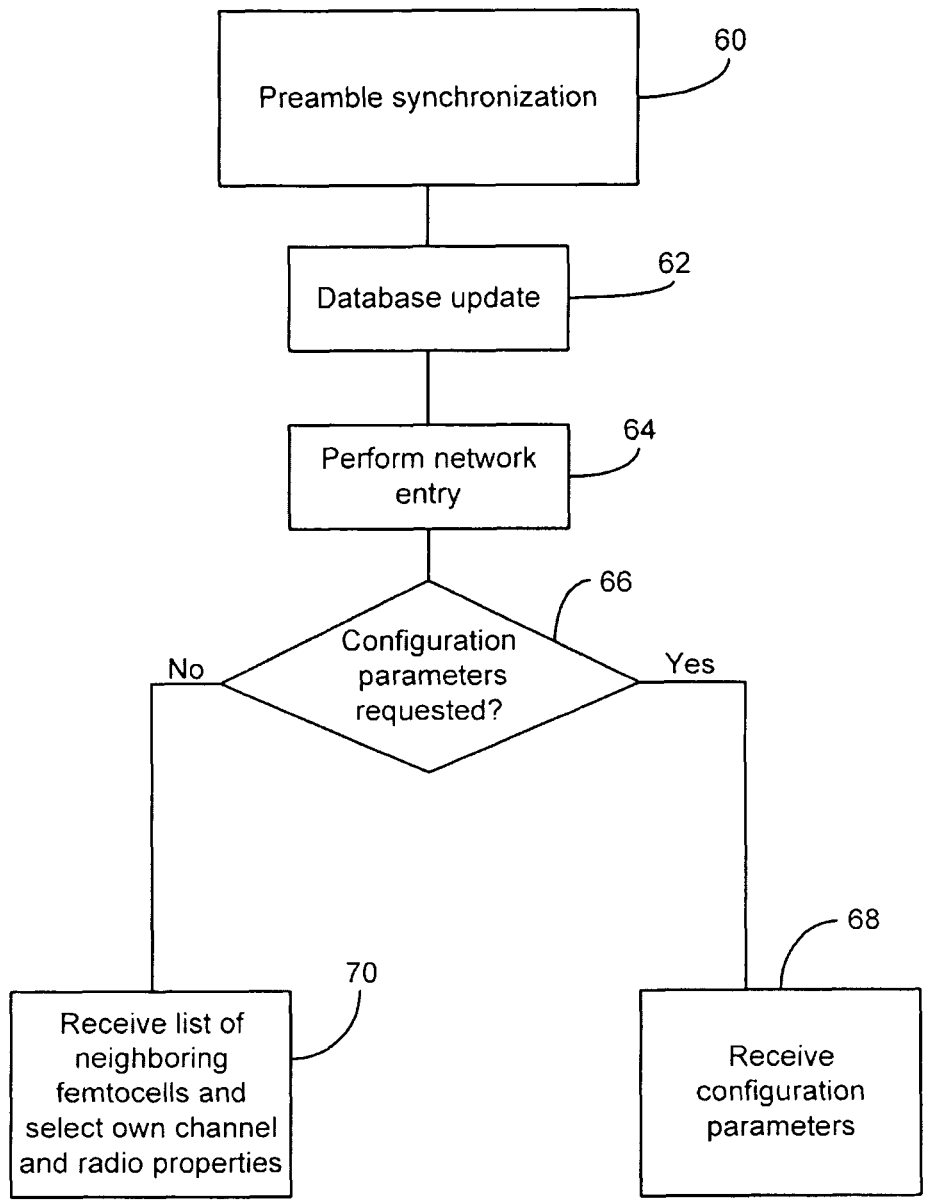
FIG. 5 is a flow chart illustrating a passive sniffing method, according to another embodiment of the invention.

There are two different approaches to performing radio resource allocation to the femtocells, according to the present invention. One is using a distributed algorithm, where each femtocell performs an active process of channel selection, whose process is described below with reference to FIG. 3. This distributed algorithm is based on the fact that each femtocell performs sniffing and then, according to the parameters measured, determines optimum parameters for its own transmissions, e.g., according to a best channel determination, selects a channel on which to operate. Another approach, to allocate channel configuration parameters to a femtocell, described below with reference to FIG. 5, is based on a centralized management process running on a core network.

Figure 3:
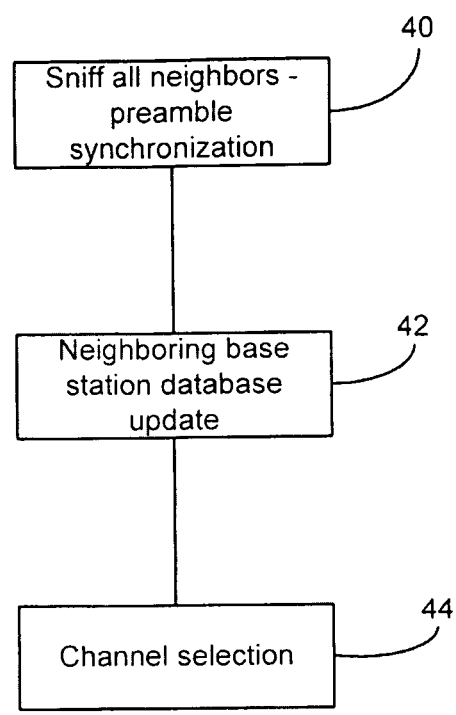
FIG. 3 is a block diagram illustration of an active sniffing method, according to one embodiment of the invention.

An active sniffing mode, according to one embodiment of the invention for use in a distributed network, is illustrated in block diagram form in FIG. 3. The femtocell sniffs (receives transmissions from) all the femtocells around it, in order to implement synchronization and allow correct measurement of interfering neighboring femtocells, based on the preamble information. The process is activated when a new femtocell is deployed, or periodically at pre-set intervals to reconfirm the femtocell configuration. After the initial cell sniffing and channel selection process, the femtocell acts as an access base station that incorporates capabilities of sniffing other femtocells on other frequencies, during operation as a base station (as by using additional RF down-converting chains). The procedure for determining channel parameters can be implemented periodically—to monitor interference and determine whether the surrounding conditions have changed to such an extent that the femtocell's parameters should be changed. Each time, the femtocell generates a database of scanned sniffed base stations from which various statistics can be calculated for later use in selecting the properties of the femtocell. This monitoring can be cyclic monitoring or event driven, for example, a sudden low SNR, or a jump in the error rate in a cell, etc.

Thus, during its initial synchronization, the femtocell identifies neighboring femtocells, beginning with a preamble synchronization process (block 40). The sniffing femtocell begins to receive the preambles being transmitted by neighboring femtocells. If the femtocell was already acting as an access base station, it will cease transmitting its own preamble at this time, in order to receive the neighboring transmissions. According to one embodiment of the invention, which is one of the options for use in a WiMAX network, the synchronization process utilizes the WiMAX downlink preamble. Preamble synchronization can be accomplished in any fashion.

One preferred method is described in detail in Applicant's co-pending U.S. application Ser. No. 12/269,904. In this application, synchronization of the preamble detection is performed in three parts: first, Time Domain (TD) Preamble Detection, which estimates the preamble time of arrival, based on the preamble's time domain characteristics, and the fractional Carrier Frequency Offset (CFO) between the femtocells; then fractional CFO correction and symbol timing correction. And finally, Frequency Domain (FD) Preamble Detection (after Fast Fourier Transform processing), which performs a Cell Search, Integer CFO and AP Power estimation.

Utilizing the data acquired during the preamble synchronization, the sniffing femtocell generates or updates a database of RF parameter data of all the neighboring femtocells (block 42), including BSID, sector ID, segment ID, frequency on which the neighboring femtocell is transmitting, and the signal statistics of the neighboring transmission, including RSSI, CINR, frequency offset and timing offset. Based on this database, the sniffing femtocell proceeds to calculate its own channel and radio properties (block 44), including the RF frequency over which it can transmit, and it may, optionally, select its own sector ID, segment ID and power of transmission. The selection of transmission frequency can be based on the frequency of the neighbor having the lowest RSSI, or the lowest SNR, or other physical parameters.

Figure 4:
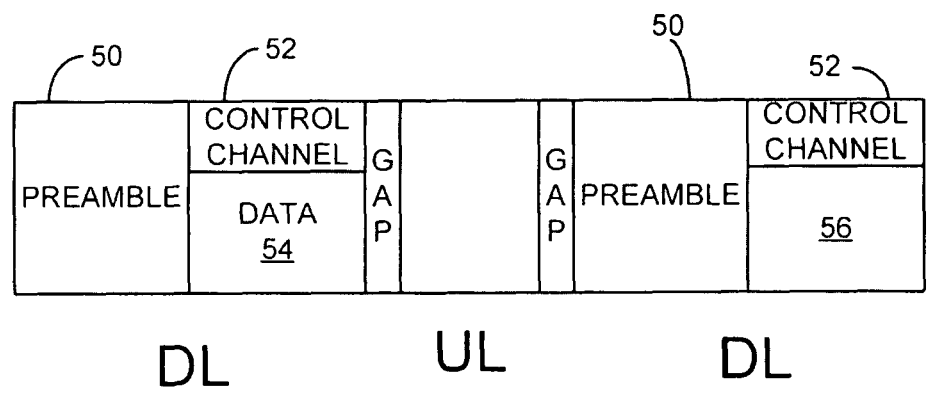
FIG. 4 is an exemplary WiMAX frame structure, according to an alternative embodiment of the present invention.

It will be appreciated that the neighboring cells database can be updated on the fly, during operation. According to one embodiment of the invention, femtocells which decide to make measurements can allocate quiet frames, as shown schematically in FIG. 4, on which the femtocell will transmit only necessary information required to permit the various femtocells to maintain synchronization with that femtocell, e.g., preamble and control channels. Thus, instead of transmitting its preamble 50, control channel signals 52 and data 54 in the downlink frame, it merely transmits the preamble 50, and control channel signals 52. The portion 56 of the frame ordinarily utilized to transmit data is empty, so the femtocell can switch to any other particular frequency to implement sniffing, and measure the signals received during that time.

It will further be appreciated that for femtocells deployed indoors having only two antennas, there is no need for a sector ID. However, when the femtocell or other base station is deployed out of doors and has multiple receive antennas, the sniffing femtocell will be capable of calculating the direction of arrival of the neighboring transmissions and will note this data, as well. For example, the sniffing femtocell can generate an RF spatial map showing the locations and parameters of each of the neighboring femtocells whose transmissions it receives. If the femtocell has multiple receive antennas, it can also select its own beam direction, among the other parameters.

If it is preferred to provide a centralized management procedure, rather than the distributed procedure described above, the femtocell can perform passive radio resource allocation, according to another embodiment of the invention, as illustrated in FIG. 5. With passive channel selection, wherein seamless service can be provided, the femtocell need not stop transmitting in order to receive and implement updated properties. Once the sniffing femtocell has performed network entry, it transfers part or all of its neighboring cells database to the synchronized neighboring femtocell, which transfers this data to a core network element (central manager). The central manager performs radio resource allocation for the sniffing femtocell. The central manager preferably includes an interference management algorithm that allocates all relevant self-planning parameters to the femtocell.

Thus, passive sniffing also begins with preamble synchronization (block 60) and generation or updating of a neighboring cells database (block 62), including an estimate of CFO, estimate of timing offset, BSID and segment ID. The femtocell utilizes this database as a list of potential femtocells in the area to which it can connect, notes the frequencies, configuration and maximum power of its neighbors, and automatically performs network entry (block 64), i.e., registers itself as a subscriber (like a mobile station) to one of its neighbors which is synchronized via wired backhaul. This neighbor may be a femto-, pico-, micro-cell and can be located indoors or outdoors. In this case, the femtocell synchronizes on the neighbor femtocell, by means of its preamble, and a backhaul channel is allocated for the sniffing femtocell by the manager of the neighboring femtocell. Communication between the femtocells is preferably provided by an in-band backhaul communication system. One in-band backhaul system providing high capacity backhaul between links is described in detail in applicant's co-pending US application serial number US 2008/0090575, described above.

If the synchronization process is completely passive, the femtocell will request configuration parameters (block 66). The selected channel and other parameters are communicated, over the air, to the femtocell, which awaits resource allocation. The femtocell receives these parameters (block 68) and implements the changes. In this case, the femtocell can get a new configuration (i.e., of frequency) when required by changes in the surrounding transmission conditions, without being required to stop serving its local customers. It would even be able to receive advance notice of the new frequency, and could notify its mobile stations that its transmissions will, henceforth, be on the new frequency. Thus, seamless service can be provided. It will be appreciated that this will effectively turn the femtocells into a virtual cluster that was not designed in advance, which is not possible in conventional networks.

It will also be appreciated that this network entry step can be utilized even among femtocells that do not wish to receive configuration properties from a neighbor but wish to utilize the constraints to sniffing provided by a centralized manager. In this case, a hybrid method is envisioned, also illustrated in FIG. 5. Such a method would begin like the passive sniffing until reaching network entry, blocks 60 to 64. At this stage, the femtocell will not request configuration parameters (block 66), but rather, the core network or central manager would provide only a list of specific neighboring femtocells whose channel and other parameters the sniffing femtocell can use. The sniffing femtocell would then make its own selection of the channel and radio properties of one of the listed neighboring femtocells (block 70).

While the invention has been described above with regard to a WiMAX network, it can alternatively be utilized with LTE or any other 4G technology.

While the invention has been described with respect to a limited number of embodiments, it will be appreciated that many variations, modifications and other applications of the invention may be made. It will further be appreciated that the invention is not limited to what has been described hereinabove merely by way of example. Rather, the invention is limited solely by the claims which follow.

The invention claimed is:

1. A sniffing femtocell comprising:
 means for synchronizing the sniffing femtocell on a preamble transmitted by a neighboring femtocell over a wireless communication network;
 means for determining radio and physical layer parameters of said neighboring femtocell based on said preamble and a measurement of signals received over a frequency allocated to said neighboring femtocell during a frame of said sniffing femtocell, wherein:
  said frame is divided into a downlink subframe and an uplink subframe,
  said measurement is during said downlink subframe,
  said downlink subframe comprises a preamble portion, a control channel portion, and an empty data portion,
  said parameters of said neighboring femtocell comprise a sector ID, and
  said received signals comprise a data carrier detect;
 means for determining a direction of arrival of said received signals;
 means for generating an RF spatial map based on said direction of arrival of said received signals, said RF spatial map comprising a location of said neighboring femtocell and said parameters of said neighboring femtocell; and
 means for selecting radio and physical layer parameters for said sniffing femtocell based on said RF spatial map, said radio and physical layer parameters selected for said sniffing femtocell comprising at least a sector ID, a beam direction, or a combination thereof, in said wireless communication network for said sniffing femtocell.

2. The sniffing femtocell according to claim 1, wherein said radio and physical layer parameters selected for said sniffing femtocell comprise at least a channel selection.

3. The sniffing femtocell according to claim 1, wherein said means for selecting comprises:
 means for detecting, in said sniffing femtocell, said preamble from said neighboring femtocell in said network for synchronization;
 means for determining, in said sniffing femtocell, a received signal strength indication (RSSI) and CINR (carrier to interference and noise ratio) from said preamble; and
 means for implementing radio resource and physical layer allocation by said sniffing femtocell in accordance with said determined radio and physical layer parameters.

4. The sniffing femtocell according to claim 1, wherein said means for selecting comprises:
 means for updating a neighboring femtocell parameter database in said sniffing femtocell;
 means for performing network entry by said sniffing femtocell said neighboring femtocell;
 means for requesting said radio and physical layer parameters from said neighboring femtocell; and
 means for receiving and implementing radio and physical layer configuration parameters by said sniffing femtocell.

5. The sniffing femtocell according to claim 4, wherein said means for requesting said radio and physical layer configuration parameters from said neighboring femtocell comprises:
 means for receiving said requested radio and physical layer configuration parameters from a central service through said neighboring femtocell.

6. The sniffing femtocell according to claim 5, further comprising:
 means for communicating with said central service over a backhaul channel allocated for said sniffing femtocell at said neighboring femtocell.

7. The sniffing femtocell according to claim 1, wherein said means for selecting comprises:
 means for updating a neighboring femtocell parameter database in said sniffing femtocell;
 means for performing network entry by said sniffing femtocell to said neighboring femtocell;
 means for requesting a neighboring femtocell list from said neighboring femtocell; and
 means for selecting configuration parameters by said sniffing femtocell according to said neighboring femtocell list.

8. The sniffing femtocell according to claim 7, wherein said neighboring femtocell list identifies a set of the neighboring femtocells comprising configuration parameters available for use by said sniffing femtocell.

9. The sniffing femtocell according to claim 1, wherein said radio and physical layer parameters comprise at least one of: a segment parameter, a frequency parameter, or a transmission power.

10. A sniffing femtocell comprising:
a base station transceiver having at least one receive antenna; and
a baseband processor coupled to said transceiver for implementing transmission and reception in a wireless communication network, said baseband processor configured to:
synchronize said sniffing femtocell on a preamble transmitted by a neighboring femtocell;
determine radio and physical layer parameters of said neighboring femtocell based on said preamble and a measurement of signals received over a frequency allocated to said neighboring femtocell during a frame of said sniffing femtocell, wherein:
said frame is divided into a downlink subframe and an uplink subframe,
said measurement is during said downlink subframe,
said downlink subframe comprises a preamble portion, a control channel portion, and an empty data portion,
said parameters of said neighboring femtocell comprise a sector ID, and
said received signals comprise a data carrier detect;
determine a direction of arrival of said received signals;
generate an RF spatial map based on said direction of arrival of said received signals, said RF spatial map comprising a location of said neighboring femtocell and said parameters of said neighboring femtocell; and
select, in said baseband processor, radio and physical layer parameters of said sniffing femtocell based on said RF spatial map, said physical layer parameters selected for said sniffing femtocell comprising at least a sector ID, a beam direction, or a combination thereof, in said wireless communication network for said sniffing femtocell.

11. A method for radio resource allocation of a sniffing femtocell in a wireless communication network, the method comprising:
synchronizing said sniffing femtocell on a preamble transmitted by a neighboring femtocell;
determining, in said sniffing femtocell, radio and physical layer parameters of said neighboring femtocell based on said preamble and a measurement of signals received over a frequency allocated to said neighboring femtocell during a frame of said sniffing femtocell, wherein:
said frame is divided into a downlink subframe and an uplink subframe,
said measurement is during said downlink subframe,
said downlink subframe comprises a preamble portion, a control channel portion, and an empty data portion,
said parameters of said neighboring femtocell comprise a sector ID, and
said received signals comprise a data carrier detect;
determining, in said sniffing femtocell, a direction of arrival of said received signals;
generating, in said sniffing femtocell, an RF spatial map based on said direction of arrival of said received signals, said RF spatial map comprising a location of said neighboring femtocell and said parameters of said neighboring femtocell; and
selecting, in said sniffing femtocell, radio and physical layer parameters of said sniffing femtocell based on said RF spatial map, said physical layer parameters selected for said sniffing femtocell comprising at least a sector ID, a beam direction, or a combination thereof, in said wireless communication network for said sniffing femtocell.

12. The method according to claim 11, wherein selecting said radio and physical layer parameters includes:
detecting, in said sniffing femtocell, said preamble from said neighboring femtocell in said network for synchronization;
determining, in said sniffing femtocell, a received signal strength indication (RSSI) and CINR (carrier to interference and noise ratio) from said preamble; and
implementing radio resource and physical layer allocation by said sniffing femtocell in accordance with said determined radio and physical layer parameters.

13. The method according to claim 11, wherein said selecting includes:
updating a neighboring femtocell parameter database in said sniffing femtocell;
performing network entry by said sniffing femtocell to said neighboring femtocell;
requesting said radio and physical layer parameters from said neighboring femtocell; and
receiving and implementing radio and physical layer configuration parameters by said sniffing femtocell.

14. The method according to claim 11, wherein said selecting includes:
updating a neighboring femtocell parameter database in said sniffing femtocell;
performing network entry by said sniffing femtocell to said neighboring femtocell;
requesting a neighboring femtocell list from said neighboring femtocell; and
selecting configuration parameters by said sniffing femtocell according to said neighboring femtocell list.

15. The method according to claim 11, wherein said radio and physical layer parameters comprise at least one of: a segment parameter, a frequency parameter, or a transmission power.

16. The method according to claim 11, further comprising:
subscribing said sniffing femtocell to said neighboring femtocell.

17. The method according to claim 13, wherein requesting said radio and physical layer configuration parameters from said neighboring femtocell comprises:
requesting said requested radio and physical layer configuration parameters from a central service through said neighboring femtocell.

18. The method according to claim 17, further comprising:
receiving said requested radio and physical layer configuration parameters from said central service through said neighboring femtocell.

19. The method according to claim 17, further comprising:
communicating with said central service over a backhaul channel allocated for said sniffing femtocell at said neighboring femtocell.

20. The method according to claim 14, wherein said neighboring femtocell list identifies a set of neighboring femtocells comprising configuration parameters available for use by said sniffing femtocell.

* * * * *